United States Patent
Lecocq et al.

(10) Patent No.: US 9,185,110 B2
(45) Date of Patent: Nov. 10, 2015

(54) DEVICE AND METHOD FOR SECURE ACCESS TO A REMOTE SERVER

(75) Inventors: Francois Lecocq, Paris (FR); Cyrille Pepin, Paris (FR)

(73) Assignee: MORPHO, Paris (FR)

( * ) Notice: Subject to any disclaimer, the term of this patent is extended or adjusted under 35 U.S.C. 154(b) by 0 days.

(21) Appl. No.: 13/376,916

(22) PCT Filed: Jun. 9, 2010

(86) PCT No.: PCT/EP2010/058108
§ 371 (c)(1),
(2), (4) Date: Dec. 8, 2011

(87) PCT Pub. No.: WO2010/142740
PCT Pub. Date: Dec. 16, 2010

(65) Prior Publication Data
US 2012/0084849 A1    Apr. 5, 2012

(30) Foreign Application Priority Data
Jun. 11, 2009   (FR) ..................................... 09/53907

(51) Int. Cl.
*G06F 7/04* (2006.01)
*G06F 15/16* (2006.01)
*G06F 17/30* (2006.01)
*H04L 29/06* (2006.01)

(52) U.S. Cl.
CPC ........... *H04L 63/0861* (2013.01); *H04L 63/164* (2013.01); *H04L 63/166* (2013.01)

(58) Field of Classification Search
CPC ............ G06F 8/65; G06F 21/60; H04L 63/08
USPC ............................................................ 726/7
See application file for complete search history.

(56) References Cited

U.S. PATENT DOCUMENTS
2010/0049987 A1 * 2/2010 Ettorre et al. ................. 713/186

FOREIGN PATENT DOCUMENTS
WO    WO 2008074342 A1 *  6/2008

OTHER PUBLICATIONS
Andrew D. Birrell; Secure Communication Using Remote Procedure Calls; ACM; Year: 1985; pp. 1-14.*
(Continued)

*Primary Examiner* — Monjour Rahim
(74) *Attorney, Agent, or Firm* — Bachman & LaPointe, P.C.

(57) ABSTRACT

The device and method described herein relates to the field of computer security and, specifically, to the field of protecting confidential personal information which enables encrypted access to the remote server. A device and a method for securing confidential user information and secure exchanges of such information with the servers that host the services is provided. The device and method are based on personalising a smartcard containing the information. The chip card, connected to the user terminal, has a connection enabling the terminal to appear as a standalone host of the user's local network. An encrypted connection is then established directly between the chip card and the server hosting the service for the transmission of confidential data. The data, stored on the chip card, are then exchanged with the server via the encrypted connection. The data are never accessible in plain text on the user terminal.

9 Claims, 3 Drawing Sheets

(56) References Cited

OTHER PUBLICATIONS

P. Urien; "Internet card, a smart card as a true Internet node"; Computer Communications, Elsevier Science Publishers BV, Amsterdam, NL LNKD DOI:10.1016/SO140-3664(00) 00252-8, vol. 23, No. 17, Nov. 1, 2000, pp. 1655-1666; XP004238469; ISSN: 0140-3664.

H. Karen Lu et al.; "A New Secure Communication Framework for Smart Cards"; Consumer Communications and Networking Conference, 2009. 6th IEEE, Piscataway, NJ, USA; Jan. 10, 2009; pp. 1-5, XP031425432; ISBN: 978-1-4244-2308-8.

Pascal Urien; "TLS-Tandem: a smart card for WEB applications"; Consumer Communications and Networking Conference, 2009; 6th IEEE, Piscataway, NJ, USA; Jan. 10, 2009; pp. 1-2; XP031425704; ISBN: 978-1-4244-2308-8.

Walter Hinz et al.; "Authentication for Web Services with the Internet Smart Card"; Jan. 1, 2008; Securing Electronic Business Processes; ISSE 2008; Highlights of the Information Security Solutions Europe 2008 Conference, Vieweg + Teubner, DE LNKD-DOI:10-1007/978-3-8348-9283-6_38; pp. 357-366; XP008116264; ISBN: 97838348066404; figure 5.

* cited by examiner

DEVICE AND METHOD FOR SECURE ACCESS TO A REMOTE SERVER

BACKGROUND

The present invention concerns the field of computer security and more precisely the field of the protection of confidential personal information allowing encrypted access to a remote service.

At the present time, because of the extensive development of the internet, a user can access an increasing number of so-called "online" services. The majority of these services require authentication of the user to allow him access to data that concern him. As an example of such services, access to bank account data, monitoring reimbursement transactions for medical services or on-line tax returns can be cited.

FIG. 1 illustrates the architecture of the network. The user typically uses a terminal 1.1 such as a personal computer or any similar device such as a personal assistant or a smartphone. This terminal is connected to an information exchange network 1.2, typically the internet. Servers 1.3 hosting the remote services are also connected to this network. The user can therefore access, from his terminal, the services hosted on the servers 1.3 by means of the information exchange network 1.2.

A number of these services process confidential information and it is important to protect access to such services. This protection generally depends on making available to the user secret connection information that he must produce in order to establish connection to the service. Typically it is the user name and an associated password. At the time of connection, the user is requested to enter this name and password, which serve for authentication and for establishing an encrypted connection ensuring confidentiality of the exchanges of information between the user and the remote service. It is usual to protect these connection information exchanges in order to prevent their being stolen while they are being conveyed between the terminal and the server. This protection is typically effected by creating an encrypted connection or an encrypted tunnel between the terminal and the server. This encrypted connection or tunnel may for example be created using the SSL (Secure Socket Layer) protocol, or its successor TLS (Transport Layer Security). FIG. 2 illustrates the use of these techniques. The terminal sends a connection request 2.1, generally by means of its internet browser, to the server hosting the service. This request is not encrypted. It is interpreted by the server during a step 2.2, which responds by means of the message 2.3 comprising a public key corresponding to the certificate identifying the server or service. The terminal determines a pseudorandom symmetrical key during a step 2.4. It enciphers it by means of the public key of the server received in the message 2.3 and sends it to the server in the message 2.5. Only the server is in a position to decipher this symmetrical key by means of its private key associated with its public key. It carries out this deciphering during step 2.6. At this moment, the terminal and server share the same secret key, the symmetrical key, and are therefore in a position to establish an encrypted connection 2.7 by means of this shared key. This encrypted connection then makes it possible to exchange information between the terminal and the server in a secure manner. All the data exchanged are encrypted by means of the shared secret key and are therefore decipherable only by the two ends of the encrypted connection, the terminal and the server, which share the same secret.

It can be seen that this method makes it possible to protect exchanges between the terminal and the server. On the other hand, the data exchanged are manipulated in clear by the server and the terminal. It is assumed a priori that the server is secure because of management by professionals. On the other hand, the security of the terminal poses a problem.

This is because users are rarely conversant with techniques ensuring security of a data processing station. In addition, it is extremely difficult to obtain on their part strict compliance with security rules. It is not rare for the terminal of the user to be infected by viruses, spyware or any type of malicious software (malware). Such malicious software is capable of discovering confidential information manipulated by the terminal and sending it to third parties who can make malevolent use of it. And this even when security techniques such as those described above protect the link between the server and the terminal. It turns out that the weak point of the system, with regard to security, is the terminal of the user. The user can also be seen as a weak security point because for example of a choice of a simple password that is not very robust, or communication thereof.

These security problems pose a real problem in the development of on-line services. They cause significant losses for the economic players in this sector.

SUMMARY OF THE INVENTION

The invention aims to solve the above problems by offering a device and method for protecting confidential information of the user and exchanges thereof in a secure manner with the servers hosting the services. They are based on the personalisation of a smartcard containing this information.

This smartcard, connected to the terminal of the user, has connection means enabling it to appear to be an autonomous host of the local network of the user. An encrypted connection is then established directly between the smartcard and the server hosting the service for transmitting confidential data. These data, stored on the smartcard, are then exchanged with the server by this encrypted connection. They are never accessible in clear on the terminal of the user.

The invention concerns a device for secure access to a remote service comprising a smartcard; means for connecting the smartcard to a user terminal connected to a communication network; means for communication with the user terminal to which the device is connected; means for communication with a server hosting the remote service, said server being connected to the communication network, said communication means establishing communication by means of the user terminal to which the device is connected; means for storing the address of said server hosting the remote service and means for authentication with this server; means for establishing an encrypted connection between the device and the server hosting the remote service by means of said connection identifiers and means for relaying the traffic between the user terminal and the server by said encrypted connection.

According to a particular embodiment of the invention, it also comprises means for authenticating the user.

According to a particular embodiment of the invention, the authentication means are biometric means.

According to a particular embodiment of the invention, the device also comprises means for storing a list of accessible services and means for offering a choice from this list.

According to a particular embodiment of the invention, the device also comprises means for storing client software allowing access to the secure service when it is executed on the user terminal.

The invention also concerns a method of connection to a remote service that comprises a step of establishing an encrypted connection between a device comprising a smartcard and a remote server hosting a secure service, said device being connected to a user terminal itself connected to a communication network, said remote server being accessible through the communication network, the encrypted connection being established by routing of the communication via the user terminal, said encrypted connection being established by means of connection identifiers stored on said device and a step of using the service from the user terminal, the traffic between the terminal and the remote server being relayed by said device by means of said encrypted connection.

According to a particular embodiment of the invention, the device storing a list of accessible services with the corresponding identifiers, the method also comprises a step of offering the list of services to the user and a step of choosing the service with which to establish the encrypted connection.

According to a particular embodiment of the invention, the method comprises a prior step of authentication of the user.

According to a particular embodiment of the invention, the method comprises a prior step of loading software for access to the remote service from the device on the user terminal.

BRIEF DESCRIPTION OF THE DRAWINGS

The features of the invention mentioned above, as well as others, will emerge more clearly from a reading of the following description of an example embodiment, said description being given in relation to the accompanying drawings, among which.

DETAILED DESCRIPTION OF THE PREFERRED EMBODIMENT(S)

In the architecture for access to a remote secure service by a user, the weak point from the point of view of security is the terminal of the user. This is because the user is rarely conversant with the security rules enabling him to protect against contamination of the station by malevolent software. In particular, it is not rare for the terminals of users to be invaded by software such as computer viruses or spyware. Some of this malevolent software, once operational on the terminal, is in a position to spy on the actions of the user and to take cognisance of potentially confidential information of his. Among the sensitive confidential information, information enabling the user to connect secure remote services such as the site of his bank, electronic commerce sites or the like can be cited. Once it is in possession of this sensitive data, this malevolent software is capable of using the network connection of the workstation to despatch this sensitive information to third parties who may make fraudulent use thereof.

Apart from the direct loss due to these acts of piracy, the very existence of the threat is a considerable restriction on the growth of on-line services through the loss of confidence of the user. It is therefore particularly important to provide the user with means for accessing remote services in a secure manner.

Figure 1:
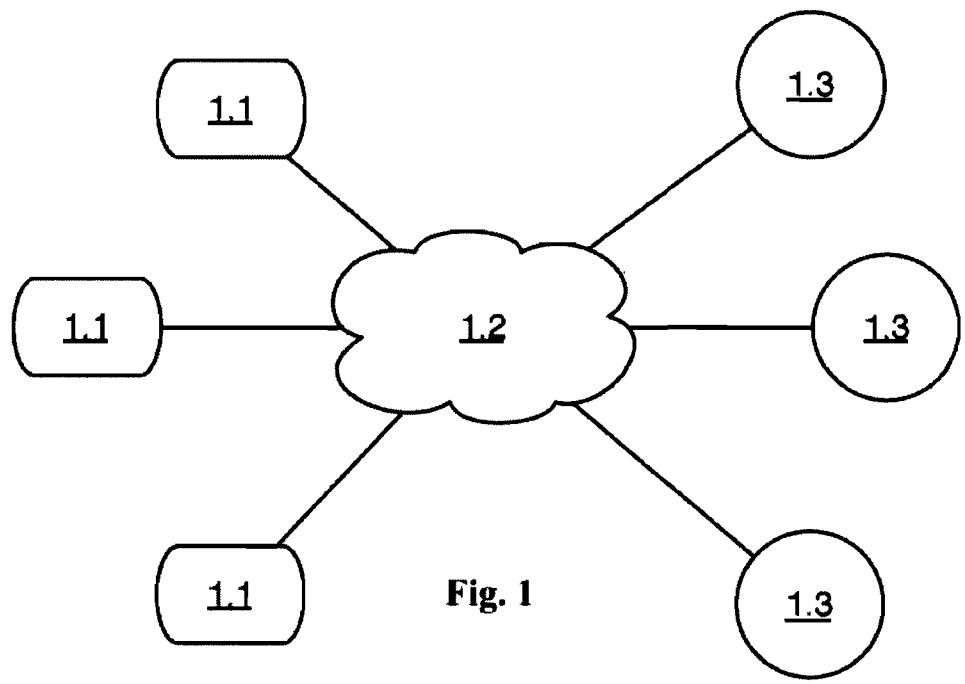
FIG. 1 illustrates the architecture of the network.
Figure 2:
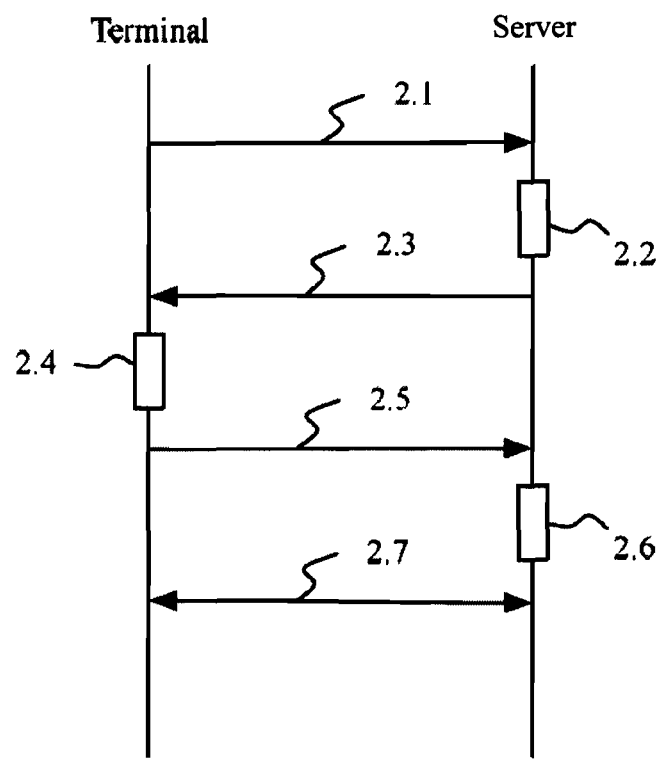
FIG. 2 illustrates an example of connection to a secure service according to the prior art.
Figure 3:
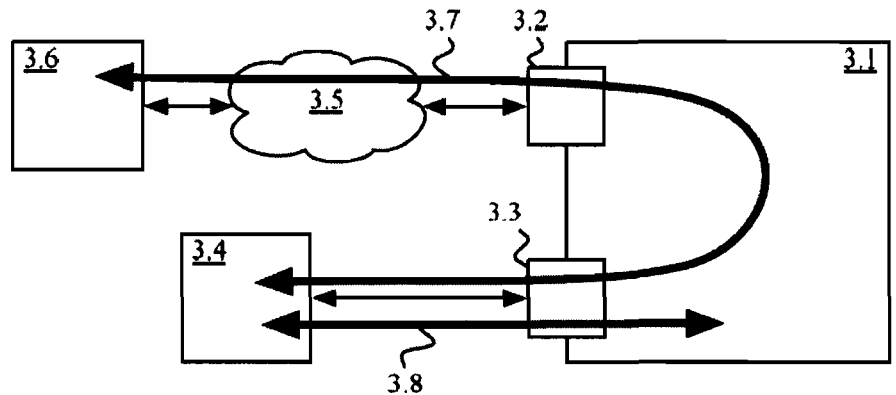
FIG. 3 illustrates the outline architecture of an example embodiment of the invention.

FIG. 3 illustrates the architecture of an example embodiment of the invention. The terminal of the customer 3.1 has a first network interface 3.2 allowing connection of the terminal to the internet 3.5. On this network servers hosting services are available. One of these servers 3.6 is shown connected to the network 3.5. The device according to the invention 3.4 is connected to the terminal 3.1 by a second network interface 3.3. This second network interface is based, in the example embodiment of the invention, on a USB serial physical interface. The arrows 3.7 and 3.8 represent the data flows during use of the device for connection of the user to a secure service. The arrow 3.7 between the device 3.4 and the server 3.6 illustrates the encrypted connection that is established between these two elements. This encrypted connection is relayed by the terminal, which then functions as a simple network router. The transferred data are protected against any attack on the part of any malevolent software on the terminal 3.1 through the encryption used for establishing the encrypted connection. The terminal therefore has no means of access to these data although they pass through it.

The arrow 3.8 in fact represents two different data flows passing between the terminal and the device 3.4. Firstly, the user may be obliged to authenticate himself with the device in order to prevent fraudulent use. He must also, at least when the device hosts several services, select the service that he wishes to access so that the device initiates the connection to this service. The confidential data allowing this connection may comprise connection name and password pairs, digital encrypting certificates and any information necessary according to the use of the service. A software module present on the device then establishes the encrypted connection with the server 3.6. Once this encrypted connection is established, the user can use the service from the terminal 3.1. This use takes place by interaction, arrow 3.8, with a software module on the device enabling information to be relayed between the server and the user by means of the encrypted connection 3.7.

Several implementations can be used here, differentiated through the intelligence level of the software loaded on the device. Once solution is as follows: the device is content with a relay (proxy) at the transport layer of the network, in this case TCP/IP (Transmission Control Protocol/Internet Protocol defined by RFC 791 and 793). The client-server model is used between a client hosted on the terminal, for example an HTTP (HyperText Transfer Protocol, defined by RFC 2616) client or browser and the device. This same model is also used between the device that hosts the client, and the remote service that the user wishes to access.

The example embodiment of the invention is based on the use of a smartcard inserted in a smartcard reader USB-connected to the client terminal. A first adaptation aims to allow TCP/IP communication on top of the USB connection. To do this, the choice related to the use of the RNDIS (Remote Network Driver Interface Specification developed by Microsoft) protocol. It is a case of a specification for network peripherals functioning on a bus such as for example USB. This choice makes it possible to be compatible without requiring any parameterising or adding any particular software with a wide selection of operating systems of the terminal of the user, such as Windows Vista, Apple Mac OS X or Linux, which in their distribution by default integrate the RNDIS management. On Windows XP it is simply necessary to add an ".inf" file of a few kilobytes. This choice therefore allows simple use of the device according to the invention with the majority of user terminals available on the market. A person skilled in the art will understand that other choices may be made on this point, more particularly if the invention is implemented with a connection other than USB between the device and the terminal.

It is also necessary to add a TCP/IP communication stack to the operating system of the smartcard, which generally lacks one. The choice here related to the TCP/IP stack used in the free operating system Contiki (http://www.sics.se/contiki/). This system is a multitask light operating system, highly portable, which contains a TCP/IP stack that is particularly adapted to porting on a smartcard because of its small resource requirements and its small size. Advantageously, this stack is made even more compact through deactivation of all the functions not strictly necessary to functioning thereof Because of the use of these two technologies, the smartcard within its USB reader acquires the status of TCP/IP network host completely. It then suffices for the terminal of the user to be configured as a relay for sharing its network connection so that the device has network access by this means.

The creation of the encrypted connection between the device and the server hosting the service requires an encryption software layer. Various solutions may be used to establish the encrypted connection, such as IPsec, a set of protocols for protecting the transportation of data on the IP protocol, PPTP (Point to Point Tunneling Protocol), SSL (Secure Socket Layer) or its development TLS (Transport Layer Security). The example embodiment is based on the use of TLS, which is advantageously implemented to use the cryptographic coprocessor generally present on smartcards. This use of the cryptographic coprocessor appreciably improves the performance of the encrypting and deciphering operations compared with a purely software solution.

Figure 4:
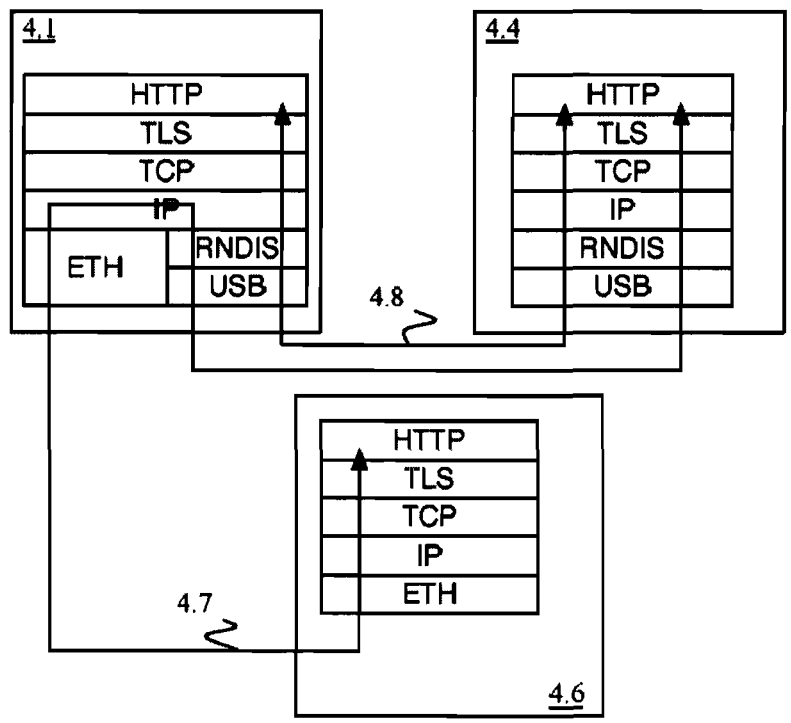
FIG. 4 illustrates the protocol architecture of an example embodiment of the invention.

FIG. 4 illustrates the protocol layers involved in the implementation of the embodiment of the invention. There are the user terminal 4.1, the device according to the invention 4.4 and the server hosting the secure service 4.6. The user terminal 4.1 and device 4.4 have a USB connection on top of which the RNDIS protocol is carried to allow IP communication. On top of IP the transport layer TCP is found in a conventional manner for implementing reliable sessions. The transfer data are protected by encryption by means of the TLS layer, which is a development of SSL. It is this layer that allows encryption and therefore the creation of the encrypted communication connection. The application layer is based in the example embodiment on a WEB environment and therefore on the HTTP transport protocol (HyperText Transfer Protocol, defined by RFC 2616).

The user terminal 4.1 has a second network interface, typically based on Ethernet, but other interfaces, such as a Wi-Fi wireless interface, can also be used, which enables it to communicate with the server 4.6. This server 4.6 also has the IP/TCP/TLS/HTTP layers already cited, typically on top of an Ethernet interface. The arrow 4.8 represents the traffic between the user terminal 4.1 and the device 4.4. Typically, this traffic corresponds to a phase of authentication of the user with the device, to the choice of the service and to the traffic relating to the chosen service, which the device returns to the terminal so as to be used by the user. As for the arrow 4.7, this represents the encrypted connection between the device 4.4 and the server 4.6. This encrypted connection passes through the terminal functioning as a network router at the IP layer.

Figure 5:
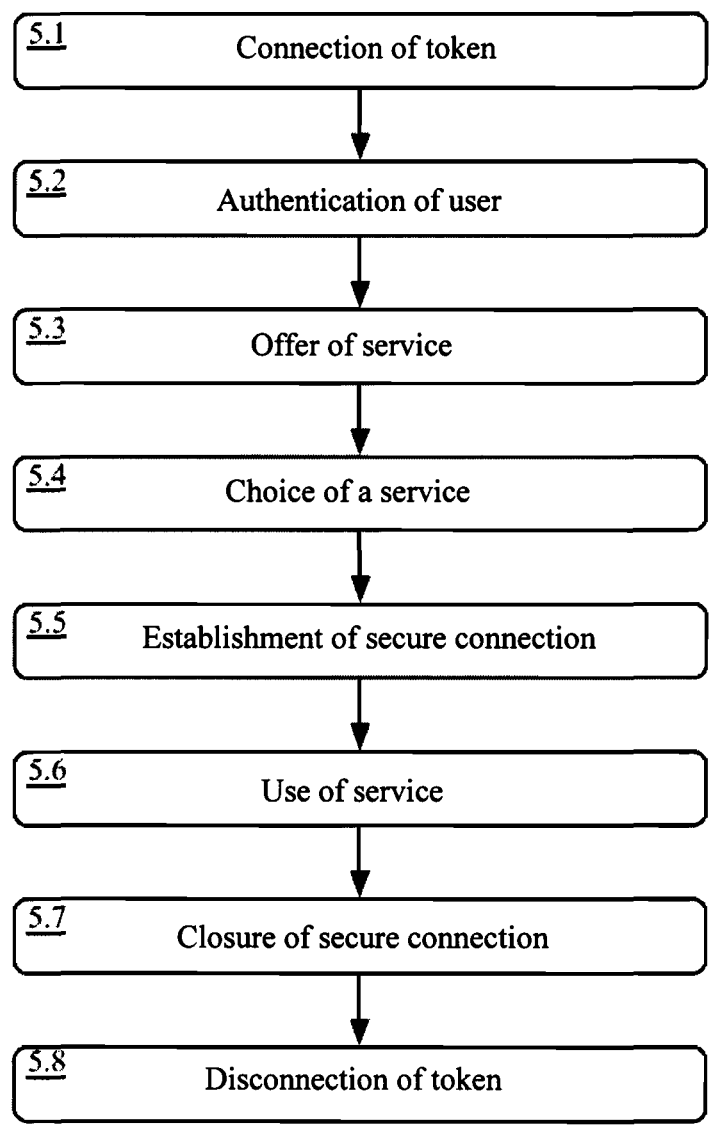
FIG. 5 illustrates the process of use of a secure service according to an example embodiment of the invention.

FIG. 5 illustrates an example of use of the invention. During a first step 5.1, the device connects to the terminal. Advantageously, in order to prevent the fraudulent use of the device during a second step 5.2, the user must be authenticated with the device. Several authentication solutions may be used. The most secure is providing the device with a biometric sensor allowing identification, for example by means of a fingerprint recognition device executed on the device (Match On Card or MOC). Because of this, no entry relating to authentication is made on the terminal of the client and is therefore not liable to be captured by malevolent software. Alternatively, authentication by password can be done. In this case, the user opens a WEB navigator, for example on the terminal, and connects to the device. The device has an onboard WEB server that offers an authentication page. Advantageously, the traffic between the terminal and the device 3.8, 4.8 is also protected by encryption. This makes it possible to limit the risks of attacks by malevolent software on the terminal. Once the user is authenticated, the device advantageously enables it to select one of the accessible services offered during a step 5.3. This step is optional, since the device can be configured so as to offer solely access to a particular service. This step may be implemented by means of a WEB page transmitted by HTTP to the terminal. The user can then select the required service during a step 5.4 of choosing the service. When the service is chosen, the device establishes the encrypted connection with the server hosting the service chosen during a step 5.5. This encrypted connection is implemented by the TLS protection layer in the example embodiment. To do this, the device has the service address and means of authentication with the server, for example the identifiers necessary for the connection to the server or to the service. These confidential data are entered in the card during a prior step of personalisation thereof. They benefit from techniques of protection against both software and hardware attacks intrinsic to smartcards. This prior programming of the card can be done by means of dedicated software on the terminal. Advantageously, this personalisation step is done before the distribution of the card to the user, for example by a service provider who may be the manager of one of the secure services, for example a banking establishment. These parameters typically consist of a list of accessible services and for each service the address of the service and the connection identifiers, advantageously a digital encryption certificate, are available. Once the encrypted connection is established, the service may be used in a conventional manner. The device then functions as a relay (proxy) of the HTTP between the user terminal and the service. The user can use the service, during a step 5.6, by means of his WEB navigator as if he were directly connected to the server via his terminal. The HTTP is directed to the device, which relays it to the server through the encrypted connection. The traffic then passes over the terminal again, but encrypted, the terminal functioning as a simple IP router. At the end of the session, the device closes the encrypted connection during a step 5.7. If a connection, for example encrypted, were established between the terminal and the device, this connection is also closed during step 5.8.

Alternatively, it is possible to further increase the security of the system by enabling connection to the device solely from client software supplied by the system rather than from the WEB browser of the terminal. This client software may be a WEB browser, but may also be a client based on a different protocol possibly developed for the occasion. Advantageously, this client is stored in a secure manner not modifiable without authorisation on the card within a storage space. This storage space may then be seen from the terminal as a removable storage peripheral visible from the terminal when the device is connected. This software allows access to the secure service when it is executed on the user terminal. Use of the device then comprises a prior step of loading this access software from the device onto the user terminal. Any manipulation of and/or spying on the exchanges by modification of the client software are thus prevented.

In doing this, the user can connect to a secure service without at any time the address of the service or the connection identifiers being present in clear on the terminal. Optionally, this information is never brought to the knowledge of the user to whom a personalised card ready for use has been supplied.

The invention claimed is:

1. Device for secure access to a remote service, comprising a smartcard; and
circuitry such that the device is configured for:
connecting the smartcard to a user terminal by a first network interface of the user terminal, said user terminal being connected to a communication network by a second network interface of the user terminal;
communicating with the user terminal to which the device is connected;
communicating with a server hosting the remote service via the user terminal, said server being connected to the communication network;
storing the address of said server hosting the remote service and means for authenticating with said server;
establishing an encrypted connection between the device and the server hosting the remote service by means of connection identifiers; and
relaying traffic between the user terminal and the server by means of said encrypted connection.

2. The device according to claim 1, further comprising said device being configured for authenticating the user.

3. The device according to claim 2, wherein the said configuration for authenticating the user comprises a biometric device.

4. The device according to claim 1, further comprising said device being configured for storing a list of accessible services and for offering a choice from said list.

5. The device according to claim 1, further comprising said device being configured for storing client software allowing access to the secure service when executed on the user terminal.

6. Method of connecting to a remote service, comprising the following steps:
establishing an encrypted connection between a device comprising a smartcard and a remote server storing a secure service, said device being connected to a user terminal by a first network interface of the user terminal, said user terminal being connected to a communication network by a second network interface of the user terminal, said remote server being accessible through the communication network, the encrypted connection being established by routing a communication through the user terminal, said encrypted connection being established by means of connection identifiers stored on said device; and
using the service from the user terminal, and relaying traffic between the terminal and the remote server by said device by the said encrypted connection.

7. The method according to claim 6, wherein storing a list of accessible services with the corresponding identifiers on the device;
offering the list of services to the user; and
choosing the service with which the encrypted connection is to be established.

8. The method according to claim 6, further comprising a prior step of authenticating the user.

9. The method according to claim 6, further comprising a prior step of loading software for access to the remote service from the device on the user terminal.

* * * * *